J. WHITNEY'S HOP DRYER.

No. 75503

PATENTED MAR 10 1868

Witnesses:
Alex Mahon
D. C. Pierce

Inventor:
J. Whitney
by Dodge & Munn
his atty

United States Patent Office.

JONATHAN WHITNEY, OF FORT WINNEBAGO, WISCONSIN.

Letters Patent No. 75,503, dated March 10, 1868.

IMPROVEMENT IN HOP-DRIERS.

*The Schedule referred to in these Letters Patent and making part of the same.*

TO ALL WHOM IT MAY CONCERN:

Be it known that I, JONATHAN WHITNEY, of Fort Winnebago, in the county of Columbia, and State of Wisconsin, have invented certain new and useful Improvements in Hop-Driers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to houses or kilns for drying hops, and consists in certain new and useful improvements in the arrangements of the interior of hop-drying houses, by which all waste of the lupuline, seeds, and other matter usually lost by the usual method of drying hops, is avoided. In the drawings—

The old or usual method of drying hops is to place them on a floor-cloth of open texture, supported by open slats, or any other suitable manner. The floor-cloth is placed in a stationary position in the kiln, and directly over the heating-apparatus. When the hops are sufficiently dried, they are removed by raking, shovelling, and sweeping, or in some other similar manner. But when treated in this rough way, the hops are very much broken, and the lupuline and seeds are almost entirely wasted and lost.

The object of my invention is to avoid this waste and loss by doing away with the necessity of raking, shovelling, or sweeping the hops from the drying-floors now in use, or similar ones.

Figure 1:
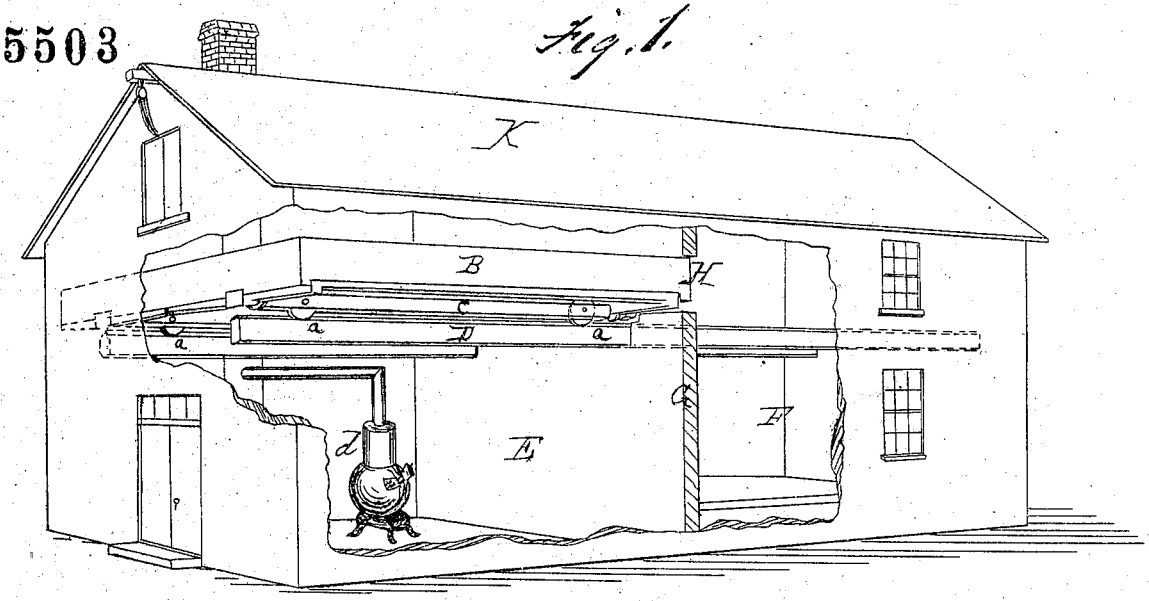
Figure 1 is a perspective view, with a portion broken away, so as to show the internal arrangement.
Figure 2:
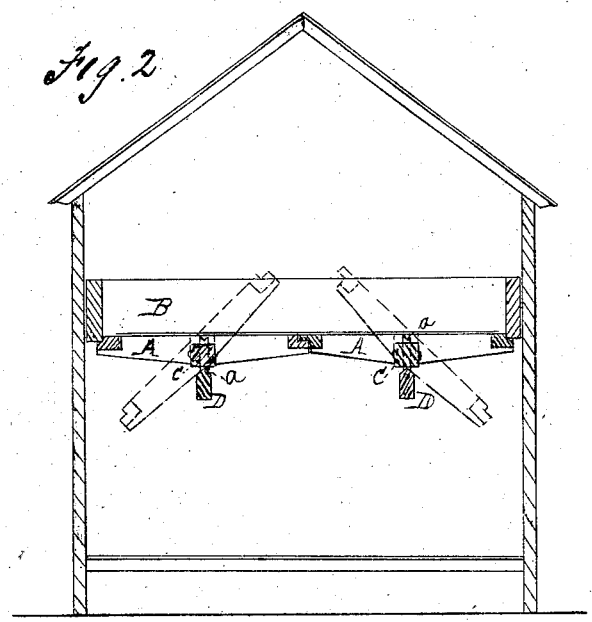
Figure 2 is a cross vertical section.
Figure 3:
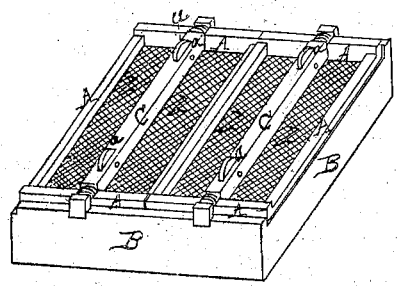
Figure 3 is a view in perspective of the frame B, detached and inverted.

I construct my hop-drier in the form of a house of any desired size or shape, or it may consist of two rooms in any house, barn, or shed suitable for the purpose. In the drawings I have represented it in the form of a house, K, as shown in fig. 1. This house I divide into two rooms, E F, by a partition, G. Room E, I use as the kiln or dry-room, and the room F for the store-room. Within the kiln or dry-room E, and at a suitable distance from the floor, I place a curbed frame, B, large enough to fill or surround the interior of the room, and having a curb entirely around it, as shown in all the figures. In the bottom of this frame B, I place a floor-frame, A, provided with floor-cloth b, as shown in fig. 3. The floor-frame A, I divide, when desired, into two or more sections, and provide each section with a floor-cloth. In the drawings, the floor-frame A is divided into two sections. The floor-frames of each section are supported by the joists or beams C, which are firmly attached to the frame B, which, with its curb, surrounds both sections, and are supported in such a way that they may be turned on their supports, as shown in red lines in fig. 2, either by being hinged or connected in any other manner suitable for the purpose. The sides of the floor-frames A, I make with edges provided for lapping, as shown in fig. 2, so that when horizontal, they will cover the whole of the space within the curbed frame B. The joists or beams C, I provide with trucks or rollers a, which run upon the beams D, as shown in fig. 1. The beams D extend through the whole length of both rooms E and F, and serve as a track for the frame B, with its drying-floor and trucks or rollers, to run on. In the partition G, I make an opening, H, just large enough to permit the frame B to pass through on the tracks D from one room to the other, and also so that when it (the frame B) is either in one room or the other, its curb will just close the opening, as shown in fig. 1. The dry-room may be heated by a stove, d, or in any other suitable manner.

In operating my hop-drier, I place the frame B within the dry-room E, as shown in fig. 1, and then place upon the floor-cloth b the hops to be dried. When they are sufficiently dried, I roll or move the frame along the track D into the store-room F, and turn the floor-frames A, as shown in fig. 2, so as to empty the dried hops on to the floor of the store-room F. This done, the floor-frames A are straightened, the frame B run back on the track D into the dry-room E, when hops are again placed in, dried, and removed as before.

Thus it will be seen by the use of my hop-drier there can be no loss or waste in removing the dried hops from the drying-cloths, and that everything is securely placed into the store-room.

In operating my hop-drier, there is no necessity for the operator to labor in the drying-room with the temperature varying from 130° to 180° Fahrenheit, for the purpose of removing, turning, or putting on a flooring, as all this can be done when the frame B is run out of the dry-room.

In the drawing the heating-apparatus is shown as a stove, but it may be a furnace, and arranged so as to be fired without going into the dry-room at all.

Having thus described my invention, what I claim, is—

1. A hop-drier, consisting of a drying-room E and store-room F, and provided with a curbed frame, B, having tilting drying-floors, mounted on a track, D, all constructed and arranged to operate substantially as described, and for the purpose set forth.

2. The curbed frame B, and tilting drying-floors A, constructed and arranged to operate substantially as described, and for the purpose set forth.

JONATHAN WHITNEY.

Witnesses:
   C. C. BRITT,
   O. P. WILLIAMS.